April 1, 1924. Re. 15,810

A. C. CRIMMEL

BIN FOR SUGAR AND THE LIKE

Original Filed Dec. 8, 1920 2 Sheets-Sheet 1

INVENTOR.
A. C. CRIMMEL.

BY

ATTORNEYS.

April 1, 1924.

A. C. CRIMMEL

Re. 15,810

BIN FOR SUGAR AND THE LIKE

Original Filed Dec. 8, 1920 2 Sheets-Sheet 2

INVENTOR.
A. C. CRIMMEL.

BY

ATTORNEYS.

Reissued Apr. 1, 1924. Re. 15,810

UNITED STATES PATENT OFFICE.

ALVIE C. CRIMMEL, OF HARTFORD CITY, INDIANA.

BIN FOR SUGAR AND THE LIKE.

Original No. 1,449,974, dated March 27, 1923, Serial No. 429,133, filed December 8, 1920. Application for reissue filed October 5, 1923. Serial No. 666,861.

*To all whom it may concern:*

Be it known that I, ALVIE C. CRIMMEL, a citizen of the United States, residing at Hartford City, in the county of Blackford and State of Indiana, have invented a new and useful Bin for Sugar and the like, of which the following is a specification.

This invention relates to bins for holding sugar and the like, one of its objects being to provide a simple, compact and efficient device of this character especially designed for use in connection with kitchen cabinets.

A further object is to provide a bin mounted within a supporting bracket, said bin having sliding connection with the bracket so that it can be swung to a desired position to give access to the contents of the bin through the top thereof whereby said contents can be removed by means of a scoop, spoon or the like.

Another object is to provide a bin which can be moved to any desired angle upon its support and which can be moved in different directions to suit the convenience of the user.

A still further object is to provide a bin which can be readily removed from its support, there being no pivot studs or similar devices likely to become worn and which would require the exercise of care in assembling the parts.

A further object is to provide a bin which, when removed from its support, can be caused to stand upon a table or the like while being filled.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

Figure 1:
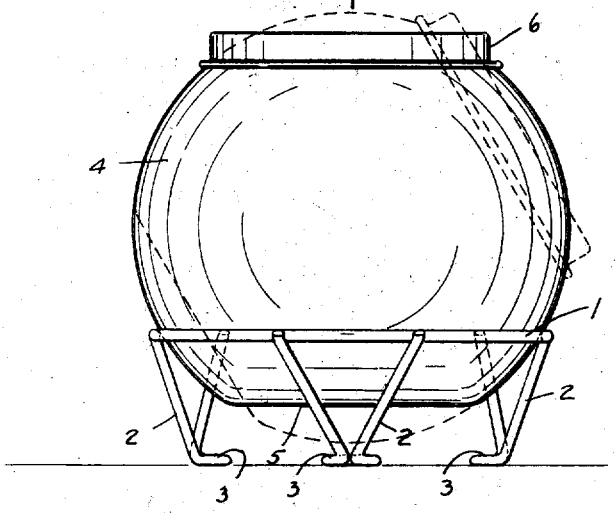
Figure 2:
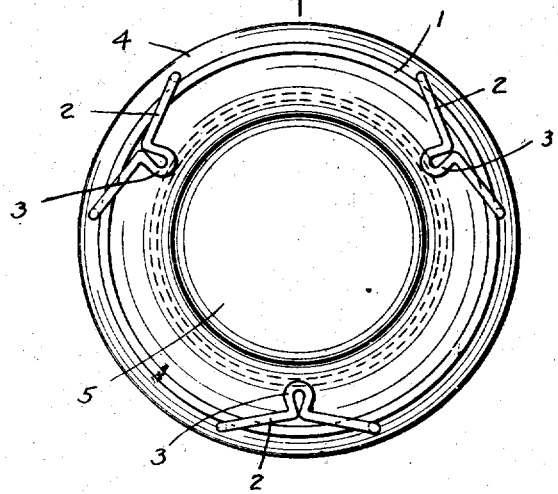
Figure 3:
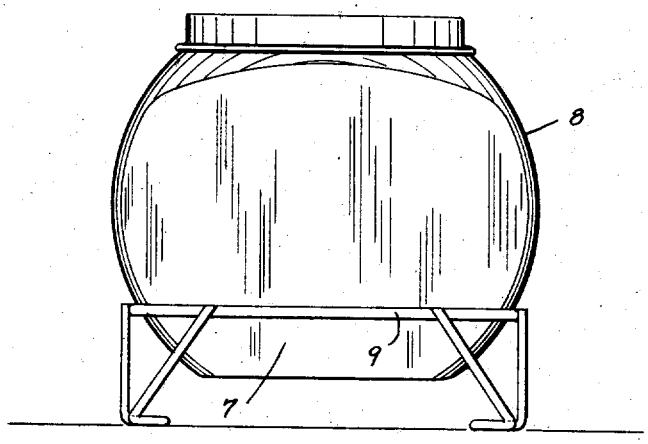
Figure 4:
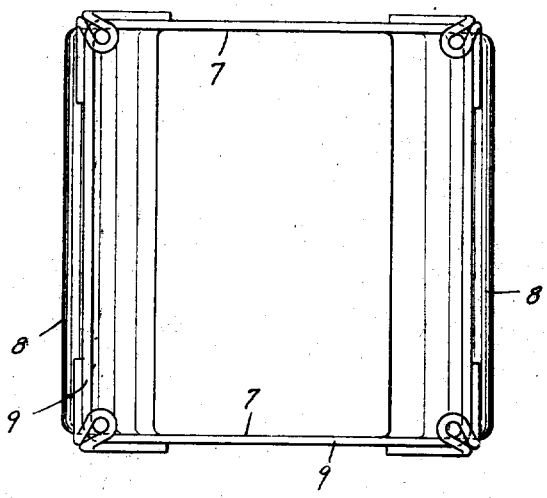

In said drawings Fig. 1 is a front elevation of the device, the same being shown in normal position by full lines and, by dotted lines, in tilted or delivering position. Fig. 2 is a bottom plan view. Fig. 3 is a side elevation of a modified form of device. Fig. 4 is a bottom plan view thereof.

Referring to the figures by characters of reference 1 designates a supporting ring having legs 2 extending downwardly therefrom and preferably provided with inturned loops 3 constituting feet adapted to be secured to a table or supporting shelf by means of screws or the like.

Mounted on the ring 1 and extending therethrough is a substantially spherical bin or container 4 preferably formed of glass and also preferably provided with a flattened bottom as indicated at 5. A removable cap or closure 6 serves to close the inlet at the top of the bin or container.

Under normal conditions this container is supported in an upright position as indicated by full lines in Figure 1. While thus positioned the cover 6 can be removed and the bin can be filled or, if preferred, the container or bin can be lifted out of the ring 1 and placed on a table with the flat bottom 5 engaging the table top. The container can then be filled and subsequently replaced on the ring as shown in Figure 1. When it is desired to remove a part of the contents of the sugar container the same can be tilted in any direction within the ring, as indicated for example by dotted lines in Figure 1 and by removing the cover, access can be had readily to the contents, thus permitting the use of a scoop, spoon or the like.

Although the device can be constructed with a spherical container as described it is to be understood that the container may be made with opposed flat faces as shown in Figures 3 and 4 at 7, the other walls of the container being arcuate as indicated at 8. A structure of this character can be mounted in a square ring and is capable of being tilted in two directions, the supporting ring being indicated at 9. Obviously various other modifications of the structure can be made within the scope of what is claimed.

The invention claimed is:

1. A dispensing bin including a supporting structure, a globular container resting thereon for tilting movement in any direction, said container having a flat bottom for holding the container upright on a surface when the container is removed from its support, a neck portion on the top of the container, there being an inlet surrounded by the neck portion, and a closure for the inlet and detachably engaging the neck portion, said neck portion cooperating with the supporting structure to limit the movement of the container when tilted in any direction on the structure.

2. A dispensing bin including a supporting frame, a container having curved sides adapted to seat on said frame and be supported thereby, said curved sides being formed so as to bulge outwardly beyond said frame and terminating in a reduced opening in the top thereof, whereby said container may be tilted by slidably varying its position upon said frame.

In witness whereof, I have hereunto affixed my signature.

ALVIE C. CRIMMEL.